United States Patent [19]

Bushnell

[11] Patent Number: 5,703,939
[45] Date of Patent: Dec. 30, 1997

[54] METHOD FOR DETERMINING AN OPTIMUM POINT FOR DATABASE QUERIES DURING CALL DELIVERY IN A TELECOMMUNICATIONS NETWORK

[75] Inventor: William Jackson Bushnell, St. Charles, Ill.

[73] Assignee: Lucent Technologies, Inc., Murray Hill, N.J.

[21] Appl. No.: 507,892

[22] Filed: Jul. 27, 1995

[51] Int. Cl.$^6$ .............................. H04M 3/42; H04M 7/00; H04M 15/00

[52] U.S. Cl. .................. 379/113; 375/134; 375/207; 375/211; 375/220; 375/230

[58] Field of Search .................... 379/111, 112, 379/113, 133, 134, 201, 207, 215, 220, 221, 230, 229, 97, 210, 211, 222

[56] References Cited

U.S. PATENT DOCUMENTS

| | | | |
|---|---|---|---|
| 4,972,464 | 11/1990 | Webb et al. | 379/207 |
| 5,048,081 | 9/1991 | Gavaras et al. | 379/221 |
| 5,237,604 | 8/1993 | Ryan | 379/220 |
| 5,270,919 | 12/1993 | Blake et al. | 379/136 |
| 5,386,467 | 1/1995 | Ahmad | 379/220 |
| 5,610,977 | 3/1997 | Williams et al. | 379/220 |

*Primary Examiner*—Curtis Kuntz
*Assistant Examiner*—Paul Lomis
*Attorney, Agent, or Firm*—Mony R. Ghose

[57] ABSTRACT

A method for determining an optimum database query point during call delivery in a telecommunications network comprises a local number portability traffic analysis system (LNP-TAS) in communication with at least one originating central office switch and one standard terminating central office switch in the telecommunications network. The LNP-TAS receives LNP database-related query statistics from each central office switch at predetermined intervals to determine an optimum database query point based upon predefined optimization criteria. Upon determination of an optimum database query point, the LNP-TAS updates the appropriate switches with switch control update messages in accordance with the optimization determination.

14 Claims, 4 Drawing Sheets

METHOD FOR DETERMINING AN OPTIMUM POINT FOR DATABASE QUERIES DURING CALL DELIVERY IN A TELECOMMUNICATIONS NETWORK

TECHNICAL FIELD

This invention relates to a method and system for determining an optimum point during call delivery for performing database queries required for routing calls to ported directory numbers in a local telecommunications network.

BACKGROUND

The public-switched telephone network includes: a large number of central office switches serving local customer lines and trunks; a smaller number of tandem switches for providing connections between central office switches; a communications network comprising a large number of analog and digital communication paths interconnecting the central office switches and tandem switches; and optional databases, such as local number portability (LNP) databases, for storing routing data used by switches for call delivery.

Calls between telephone customers in the United States are established on the basis of a national directory number plan which requires a caller to dial seven or ten digits to identify a called party. A 10-digit dialed directory number comprises a three-digit area code (generally denoted by the letters "NPA") which defines a specific geographic region and precedes a three digit office code (denoted by the letters "NXX") which identifies a particular central office switch that serves the called party. The office code is followed by a four digit customer line identifier (denoted by the letters "XXXX"). A seven-digit dialed directory number is indicative of an intra-area code call and simply comprises the three-digit office code ("NXX") followed by a four-digit customer line identifier ("XXXX"). Although a caller may dial only seven digits (NXX-XXXX) when placing a call, the caller's area code (NPA) is often prepended to the dialed seven digits by a digit receiving switch (i.e. the originating switch), as is known in the art. Therefore, every outgoing call can be treated as a 10 digit directory number even if the caller only actually dials seven digits.

There are certain situations in which the operations of an existing switching network can benefit from the introduction of additional central office switches which share one or more office codes with the existing network. Indeed, during the next several years, it is expected that the monopoly held by local exchange carriers (LECs) in providing local telephone service will be substantially altered and that competitive access providers (CAPs) will offer local telephone service to customers. When a switching network maintained by a CAP is added to a particular geographic area (i.e. a local access telecommunications area (LATA)), it is generally desirable that any transfer of customer lines between the existing local exchange carrier and competitive access providers occur without changes to customer directory numbers.

Directory numbers that include office code digits characteristic of a first central office switch but which identify customer lines actually served by a second central office switch are known as "ported" directory numbers. Proper delivery of calls to customers with ported directory numbers requires retrieval of routing data by a central office switch from a local number portability (LNP) database. Current requirements for a preferred implementation of the LNP database system specify that retrieval of routing data may be performed either by the central office switch in the local area which first receives the dialed digits of the ported directory number (i.e. the "originating" switch) or the central office switch which would normally serve the dialed NXX (i.e. the "standard terminating" switch).

One solution for establishing the point in a call delivery process at which the LNP database is queried requires originating switches to launch LNP database queries each time predetermined (i.e. "trigger") NPA-NXX digits are received. More particularly, this solution requires originating switches to make LNP database queries if the called NPA-NXX digits are identified as trigger digits. Under current practice, the NPA-NXX digits are marked and stored in the originating switch memory as triggers as soon as a single directory number is ported from the identified trigger NXX. Retrieval of routing data by the originating switch is the most time-efficient means for delivering an outgoing call to a ported directory number since the serving switch (i.e. the central office switch that actually serves the ported directory number) is identified before call delivery is attempted. However, querying an LNP database for routing data is least efficient for non-ported numbers which need no additional routing information. Hence, if only a few customer telephone lines in a trigger "NXX" (i.e. standard terminating central office switch) have been ported, launching LNP database queries at the originating switch may cause needless LNP database queries as the vast majority of queries result in a "no routing data found" response.

Another solution for establishing the point in the call delivery process at which an LNP database is queried is a default query process. In accordance with the default query approach, LNP database queries are performed by the standard terminating switch (that is, the switch which normally serves the dialed NXX-XXXX that has now been ported). Particularly, a standard terminating switch which receives an incoming call initially attempts to deliver the call normally (i.e. without querying an LNP database). If the call cannot be delivered normally, an LNP database query is launched. Retrieval of routing data from an LNP database by the standard terminating switch minimizes the number of LNP database queries since the majority of calls delivered to the terminating switch will be delivered normally. However, for every ported number, a re-routing from a standard terminating switch is required. Hence, if a particular standard terminating switch has many ported directory numbers, a default LNP database query process increases the overall call delivery time of ported numbers since the call has been initially routed to a central office switch that no longer serves the dialed directory number.

Although the advantages and disadvantages of querying an LNP database at the originating or standard terminating switch are known, proposed implementations of LNP database systems do not address the need to intelligently determine an optimum LNP database query point (i.e. either the originating switch or the standard terminating switch) in the call delivery process and to automatically respond to the dynamic nature of ported directory number traffic. Indeed, the current practice of storing trigger NPA-NXX digits in central office switches upon transfer of a single directory number out of the trigger NXX eliminates the ability of the network to reflect to actual ported directory number traffic.

Therefore, there is a need in the art for intelligently determining the optimum point for querying an LNP database to obtain routing data required for call delivery and automatically updating central office switches in accordance with the determination.

SUMMARY OF THE INVENTION

This need is addressed and a technical advance is achieved in the art by the method and system of the present invention which automatically gathers LNP database-related query statistics to determine an optimum LNP database query point in a call delivery process and updates central office switches in accordance with the determination.

In one preferred embodiment of the method of the present invention, a local number portability traffic analysis system (LNP-TAS) is established such that it receives LNP database-related query statistics from each central office switch in its service area. The LNP-TAS uses the statistical information to intelligently determine the optimum LNP database query point. In operation, each LNP database query performed by a central office switch is recorded. The record includes whether or not the dialed directory number is a ported directory number, the time expended to perform the query and the serving office of ported directory numbers. The compiled statistics are transmitted by each switch, at predetermined intervals, to the LNP-TAS over designated data links. The LNP-TAS analyzes the statistics using predefined optimization criteria (or objectives) to determine the preferred point in the call delivery process (i.e. either the originating switch or a particular standard terminating switch) for launching LNP database queries in accordance with the predefined criteria. Examples of optimization criteria include minimization of call delivery delay, minimization of database query cost for a particular local service provider, optimized routing based on time of day/week or class of service, or management of network peak hour LNP database queries. If a change in the LNP database query point is necessary, the LNP-TAS sends an update message directly to the appropriate central office switch(es) to accommodate the change.

For example, assume that the LNP-TAS has been initialized with the optimization objective to minimize call delivery delay. If a particular originating switch queries an LNP database on the basis of a particular NXX but the LNP-TAS analysis reveals that the queries have resulted in very few outgoing calls to ported directory numbers, the originating switch receives an update message indicating that the NXX should no longer serve as a trigger for database queries. The standard terminating switch corresponding to the NXX automatically performs LNP database queries as a default process. Therefore, the call delivery time for all outgoing calls from the originating switch directed to the NXX is minimized since the pre-delivery LNP database query is eliminated, and the call delivery time at the standard terminating switch is delayed only for those few calls which require an LNP database query as a default condition.

DETAILED DESCRIPTION

Figure 1:
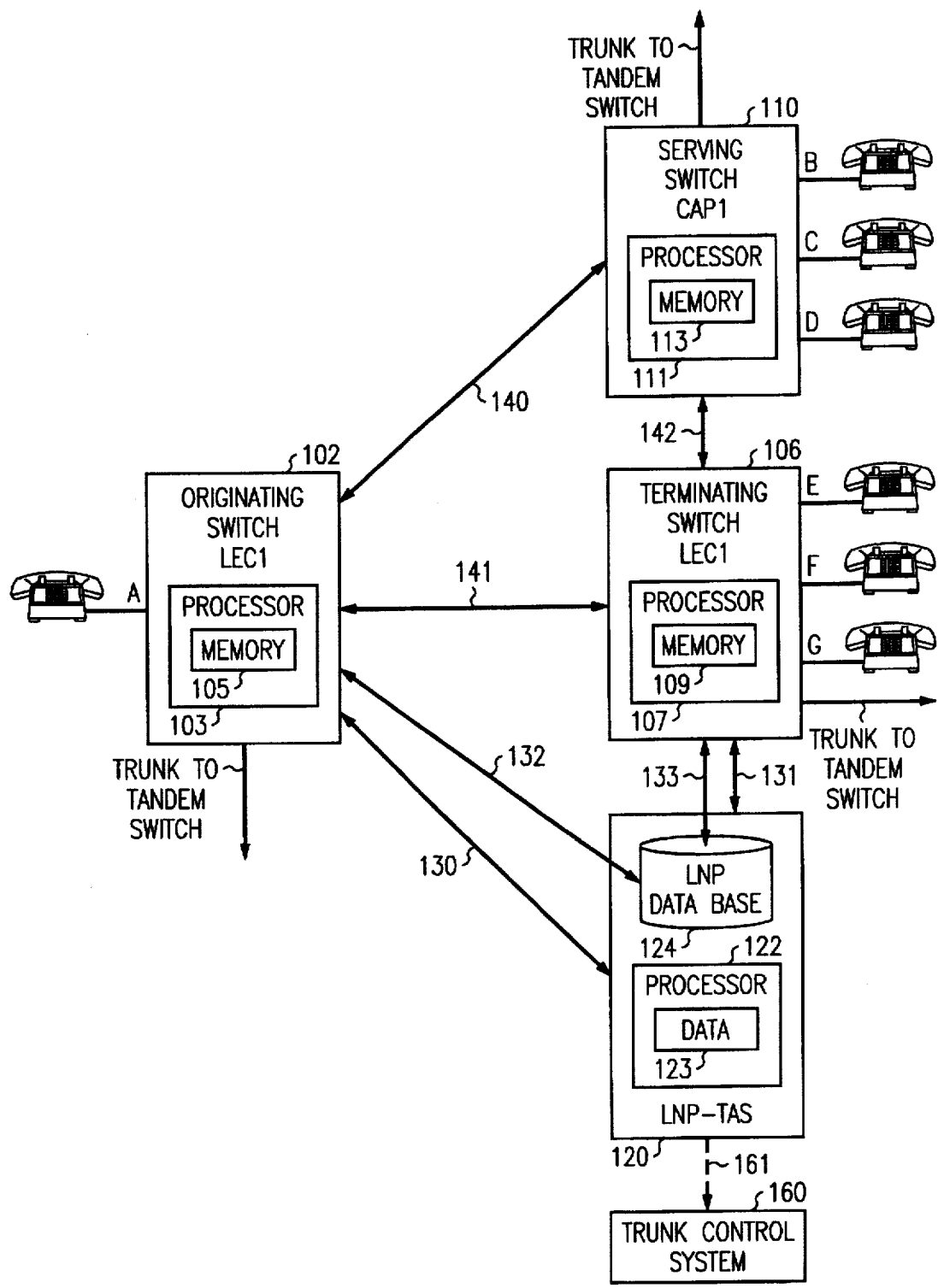
FIG. 1 is a simplified block diagram of a segment of the public-switched telecommunications network (PSTN) in which the present invention may be practiced.

FIG. 1 shows local segment 100 of the public-switched telephone network (PSTN) comprising a plurality of central office switches 102, 106 and 110 which provide local telecommunications services. Originating central office switch 102 serves customer line A and comprises processor 103 and memory 105 which operate together to maintain global control functions, such as switch administration and maintenance. Similarly, standard terminating central office switch 106 includes processor 107 and memory 109 which also operate to accomplish global control functions, and serving central office switch 110 includes processor 111 and memory 113 which serve the same purpose.

For purposes of example, assume a first local exchange carrier (LEC 1) maintains originating switch 102 and standard terminating switch 106 while serving switch 110 is maintained by a competitive access provider (CAP1). In this embodiment, standard terminating switch 106 serves customer lines E, F and G but customer lines B, C and D, which were previously served by switch 106, are now served by serving central office switch 110. Although customer lines B, C and D were transferred from a first central office switch (standard terminating switch 106) to a second central office switch (serving switch 110), assume that the customer lines continue to retain directory numbers which include office codes characteristic of standard terminating switch 106. In other words, customer lines B, C and D are "ported" directory numbers. Therefore, incoming calls directed to customer lines B, C and D require special routing data for delivery of the call to the actual service switch (in this case, serving switch 110 of CAP 1).

Also shown is Local Number Portability Traffic Analysis System (LNP-TAS) 120 including processor 122 and data memory 123 for determining an optimum LNP database query point (as described in detail below) and Local Number Portability (LNP) database 124. Although LNP database 124 is incorporated within LNP-TAS 120, it may be maintained as a separate database in alternative embodiments.

Interconnection among the central office switches is accomplished via established trunks, as is known in the art. In this embodiment, originating central office switch 102 communicates with serving switch 110 and terminating switch 106 via trunks 140 and 141, respectively. Terminating central office switch 106 communicates with serving switch 110 via trunk 142. All central office switches (102, 106 and 110) also maintain trunks to tandem switches (not shown) for extending calls outside local segment 100, e.g. an inter-area code call, or if a direct trunk to another central office switch is not available, as is known in the art.

LNP-TAS 120 (including LNP database 124) is in communication with each central office switch over designated data links. General data links 130 and 131 act as conduits for messages relating to LNP database-related query statistics and switch control update messages between LNP-TAS 120 and originating switch 102 and standard terminating switch 106, respectively. Data link 132 enables communication relating to muting data between LNP database 124 and originating switch 102 while data link 133 serves the same purpose between LNP database 124 and terminating switch 106. Although LNP database 124 communicates with the central office switches via separate data links (i.e. 132 and 133) in the embodiment shown, it may share general data links 130 and 131 to accomplish the same function.

LNP-TAS 120 is a data gathering and determination center for establishing the optimum point (i.e. either the originating switch or the standard terminating switch) in the call delivery process for querying LNP database 124. Specifically, LNP database-related query statistics are received by LNP-TAS 120 at predetermined intervals via designated switch data links and stored in data memory 123. Processor 122 uses the statistics stored in memory 123 to determine the optimum LNP database query point in accordance with predefined optimization criteria. An optional enhanced LNP-TAS 120 may also maintain a connection to trunk control system 160 via data link 161 to control the establishment/removal of trunks between central office switches within local segment 100 in response to changes in trigger NPA-NXX digits, as described below.

Figure 2:
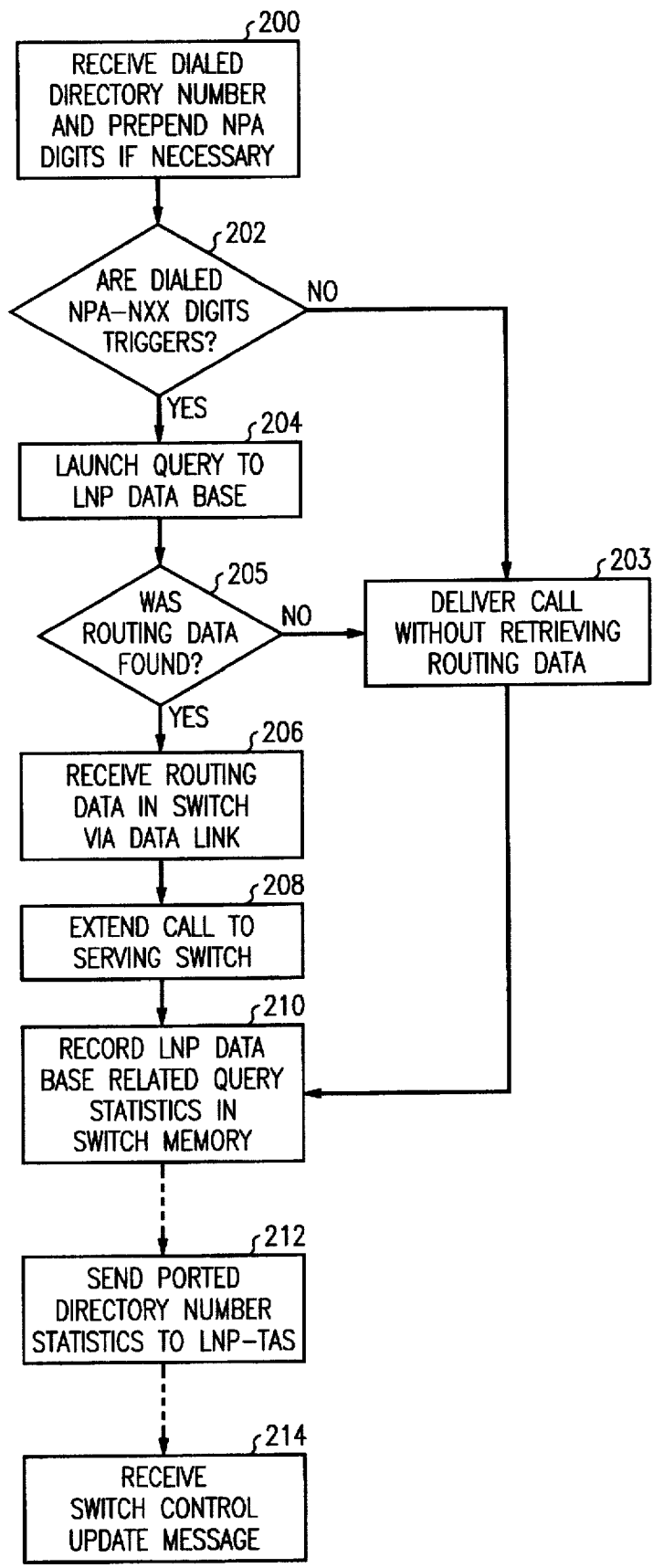
FIG. 2 is a flow diagram of the steps initiated by an originating central office switch for performing LNP database queries in accordance with the method of the present invention.

FIG. 2 is a flow diagram of the steps as performed by originating switch 102 when delivering a call to a ported directory number and interacting with LNP-TAS 120 in accordance with the present invention. For purposes of example, assume that a caller at customer line A of originating central office switch 102 places an intra-area code call by dialing directory number "555-3616" which identifies a called party who is served by customer line B of serving central office switch 110. In this example, the originating switch is the switch which serves the caller's customer line. However, for purposes of this discussion, an originating switch is the first switch in the LNP-TAS service area to receive the dialed directory number (e.g. the originating switch may be a tandem switch in the LNP-TAS service area which receives the dialed directory number). The called party has elected a new local service provider and has transferred her customer line and directory number ("555-3616") to CAP 1 serving switch 110 from LEC2 standard terminating central office switch 106. The process begins in step 200 when originating central office switch 102 receives the dialed directory number "555-3616" from the caller via customer line A and prepends the NPA digits "708" corresponding to the area code associated with the originating switch (and hence, the caller), as is known in the art. If the NPA digits are not prepended, the NXX digits serve as the basis for LNP database triggers, as described below.

In decision step 202, originating switch 102 (which has been previously programmed with LNP database trigger digits "708-555") performs digit analysis to determine whether the "NPA-NXX" digits of the dialed directory number are digits which precipitate an LNP database query. It is noted that database queries can also be triggered by more than six directory number digits (e.g. trigger digits could be NPA-NXX-X, NPA-NXX-XX. etc.) If the outcome of decision step 202 is a "NO" decision, (that is, an LNP database query is not triggered by the NPA-NXX of the dialed directory number) the process continues to step 203 in which the call is delivered without retrieving routing data and then to step 210 in which a non-ported directory number entry is recorded. Delivering the call without retrieving routing data in the originating switch does not imply that routing data is never retrieved. Indeed, retrieval of routing data may be the responsibility of the standard terminating switch, as described below. If, however, as in the exemplary case, the outcome of decision step 202 is a "YES" decision, an LNP database query is triggered and the process continues to step 204 in which originating switch 102 launches a query over data link 132 to LNP database 124.

In decision step 205, it is determined whether routing data is found in LNP database 124 for the directory number "708-555-3616". If the outcome of decision step 205 is a "NO" decision, the process returns to step 203 and then continues to step 210 in which a non-ported directory number entry is recorded. If the outcome of decision step 205 is a "YES" decision, the process continues to step 206 in which originating switch 102 receives the routing data from LNP database 124 via data link 132. The process continues to step 208 in which originating switch 102 extends the call from the caller at customer line A to a called party at customer line B of serving central office switch 110 via trunk 140 utilizing routing data received from LNP database 124.

In step 210, originating switch 102 records in switch memory 105 LNP database-related query statistics such as whether the outgoing call is directed to a ported or non-ported directory number, the time expended for the LNP database query, and the NXX of the actual switch (i.e. the serving switch) to which the outgoing call is delivered. Subsequently, at predetermined intervals (such as hourly intervals), originating switch 102 sends the compilation of all LNP database-related query statistics to LNP-TAS 120 via data link 130 in step 212. In step 214, originating switch 102 receives a switch control update message from LNP-TAS 120, as described below.

Figure 3:
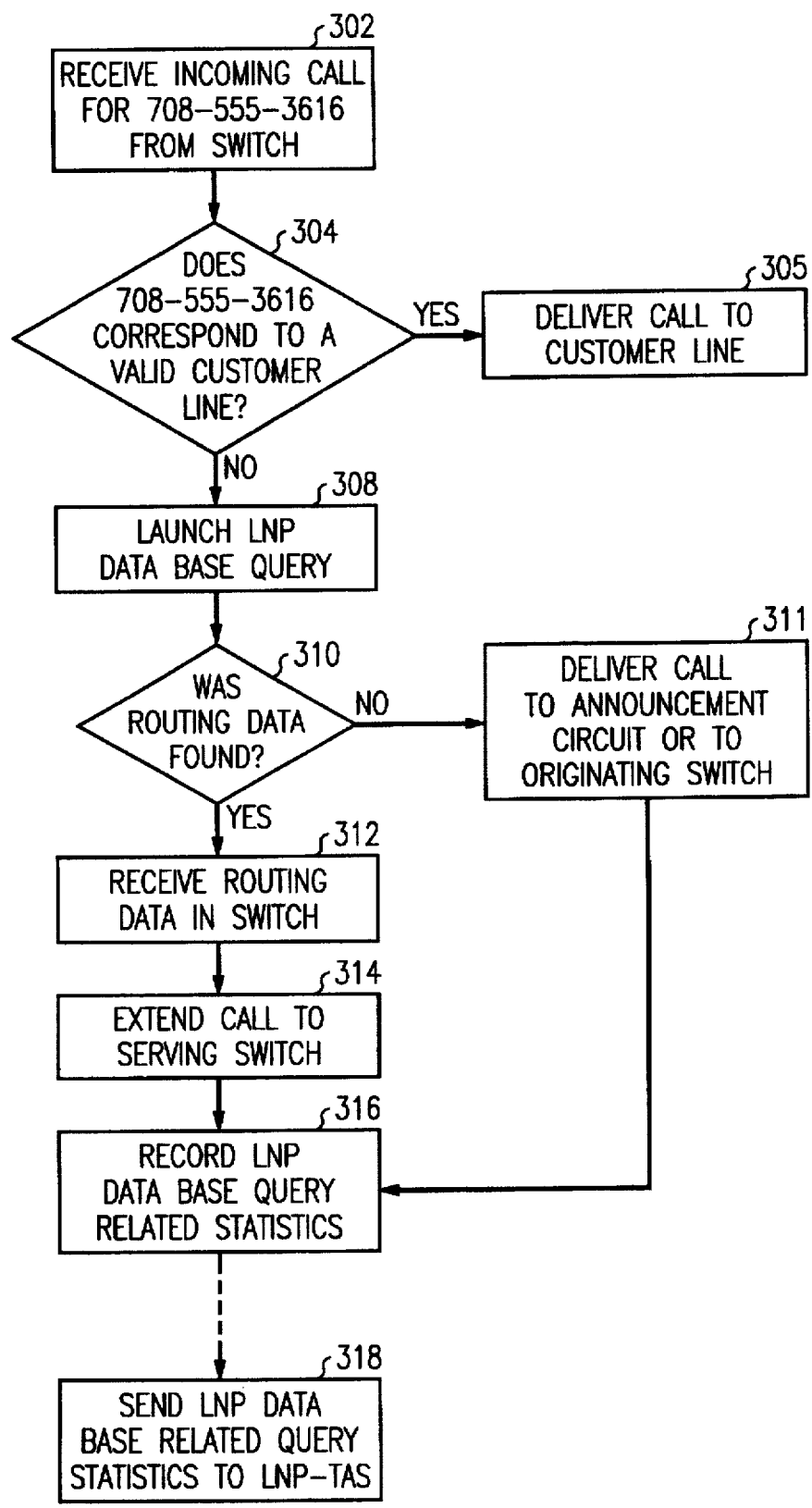
FIG. 3 is a flow diagram of the steps initiated by a standard terminating central office switch for performing LNP database queries in accordance with the method of the present invention.

FIG. 3 is a flow diagram of the steps performed by standard terminating switch 106 for delivery of an incoming call which call requires an LNP database query. For clarity, the example of a caller served by customer line A of originating switch 102 who places a call to a called party served by customer line B of serving central office switch 110 is continued.

In this call flow scenario, a default LNP database query process is employed. The process begins in step 302 in which standard terminating switch 106 receives an incoming call from originating switch 102 over trunk 141, wherein the called party is identified by directory number "708-555-3616".

In decision step 304, standard terminating switch 106 performs digit analysis of the dialed directory number to determine if the number is directed to a valid customer line on its service base. If the outcome of decision step 304 is a "YES" decision, the process continues to step 305 in which the call is delivered to the customer line corresponding to the dialed directory number. If, however, the outcome of decision step 304 is a "NO" decision, as in the exemplary case, the process continues to step 308 in which terminating switch 106 launches a query to LNP database 124.

In decision step 310 a determination is made as to whether routing data was found in LNP database 124. If the outcome of decision step 310 is a "NO" decision (that is, no routing data is received), the process continues to step 311 in which the call is extended to an announcement circuit and then proceeds to step 316 in which a non-ported directory number entry is recorded. If the outcome of decision step 310 is a "YES" decision (that is, routing data was found), the process continues to step 312 in which standard terminating switch 106 receives the routing data in the switch. In step 314, terminating central office switch 106 extends the call to the proper serving switch (serving switch 110) using the routing data retrieved from LNP database 124.

In step 316, switch 100 records in switch memory 109 LNP database-related query statistics including whether or not the incoming call is directed to a ported directory number, the time expended to perform the LNP database query and the NXX of the actual serving switch of the incoming call. Subsequently, the LNP-TAS interactive process continues to step 318 in which terminating switch 106 sends LNP database-related query statistics to LNP-TAS 120 at a predetermined interval.

Figure 4:
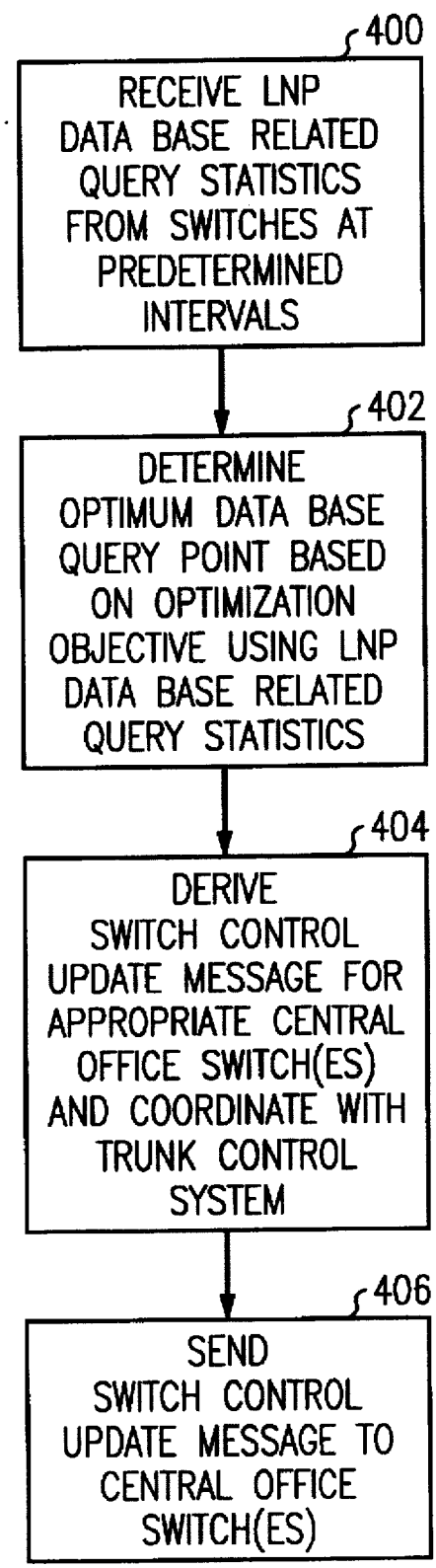
FIG. 4 is a flow diagram of the steps performed by an LNP traffic analysis system for determining an optimum LNP database query point in accordance with the method of the present invention.

FIG. 4 shows a flow diagram of the process steps performed by LNP-TAS 120 in intelligently determining an optimum LNP database query point during the call delivery process. It is assumed, in this example, that LNP-TAS 120 has been previously initialized with predefined optimization criteria to minimize call delivery time.

The process begins in step 400 in which LNP-TAS 120 receives LNP database-related query statistics from each central office switch via designated switch data links. In the exemplary case, LNP-TAS 120 receives statistics from originating switch 102 and standard terminating switch 106 via switch data links 130 and 131, respectively. The process continues to step 402 in which LNP-TAS 120 determines the optimum LNP database query point in accordance with the predefined optimization criteria using the LNP database-related query statistics received from the central office switches. For example, to determine an LNP database query point which minimizes call delivery delay between originating switch 102 and standard terminating switch 106 wherein the NPA-NXX of standard terminating switch 106 is a LNP database query trigger for originating switch 102, LNP-TAS 120 compares the volume of ported directory number calls with respect to all outgoing calls from originating switch 102.

In step 404, LNP-TAS 120 derives a switch control update message for the appropriate central office switch(es) in accordance with the determination made in the previous step. In the exemplary case, assume that the LNP database-related query statistics received from originating switch 102 reveal that a relatively small number of LNP database queries triggered by the NPA-NXX digits ("708-555") of the standard terminating switch 106 actually resulted in routing calls to ported directory numbers. Accordingly, originating switch 102 receives an update message which deactivates NPA-NXX digits "708-555" as LNP database query trigger digits such that standard terminating switch 106 becomes responsible for performing all LNP database queries for ported numbers on the switch (see FIG. 3). In alternative embodiments, LNP-TAS 120 may use statistics relating to the NXX of the serving switch to which the majority of ported directory numbers are directed to formulate new or additional NPA-NXX trigger digits to be stored in an originating switch in accordance with the volume of ported directory numbers to a particular NXX. A LNP-TAS 120 switch control update message which replaces or supplements the existing NPA-NXX trigger digits in an originating switch, however, requires coordination between LNP-TAS and trunk control system 160 such that outgoing calls to the new trigger NPA-NXX may be delivered efficiently.

The process ends with step 406 in which LNP-TAS 120 updates the appropriate central office switches by sending the switch control update message derived in the previous step to the switches over the designated switch links. Although the exemplary embodiment describes the present invention as interactions between an LNP-TAS and a plurality of central office switches, the LNP-TAS may interact with any other plurality or combination of switches, including tandem switches.

In this manner, LNP database-related query statistics as received from each central office switch may be automatically monitored and evaluated to intelligently determine the "optimum" LNP database query point in a local telecommunications network so that the switches can be automatically updated to reflect the true state of service provider local number portability in the network. It is to be understood that the above described embodiment is for illustrative purposes only and that numerous other arrangements may be devised by one skilled in the art without departing from the scope of the invention.

The invention claimed is:

1. In a telecommunications network comprising a plurality of central office switches, a method for establishing an optimum database query point in a call delivery process comprises the steps of:

recording database-related query statistics specific to a central office switch in the central office switch memory;

receiving the database-related query statistics from each central office switch in the database traffic analysis system;

the database traffic analysis system using the database-related query statistics to determine an optimum database query point; and sending a switch control update message to at least one central office switch such that the optimum database query point is established.

2. The method of claim 1 wherein recording database-related query statistics in the central office switch memory comprises the step of:

storing local number portability (LNP) database-related query statistics including whether a query resulted in extending a call to a ported directory number.

3. The method of claim 1 wherein using the database-related query statistics to determine an optimum database query point in accordance with the initialized optimization objective comprises the step of:

determining a database query point resulting in minimum call delivery delay.

4. The method of claim 1 wherein sending a switch control update message to at least one central office switch such that the optimum database query point is established comprises the step of:

the database traffic analysis system sending an update message to a central office switch over a designated link wherein the message requires the central office switch to store supplemental trigger office code digits.

5. In a local telecommunications network comprising at least one originating switch, at least one standard terminating switch and at least one serving switch, a method for determining an optimum LNP database query point during call delivery comprises the steps of:

initializing a local number portability-traffic analysis system (LNP-TAS) with optimization criteria:

recording LNP database-related query statistics in a switch memory each time an LNP database query is performed by a switch;

receiving the LNP database query statistics in the LNP-TAS at predetermined intervals;

using the LNP database-related query statistics to determine an optimum LNP database query point in the call delivery process, wherein the optimum LNP database query point is based on the initialized optimization criteria; and updating at least one switch in the local telecommunications network with a switch control update message in accordance with the optimum LNP database query point determination.

6. The method of claim 5 wherein the recording LNP database-related query statistics comprises the steps of:

recording office code digits (NXX) of the serving switch of a ported directory number;

recording a number of calls directed to ported directory numbers; and recording a number of calls directed to non-ported directory numbers.

7. The method of claim 5 wherein updating at least one switch with a switch control update message comprises the step of:

establishing additional trigger office code digits in the originating switch.

8. The method of claim 5 wherein updating at least one switch with a switch control update message comprises the step of:

deactivating existing trigger office code digits in the originating switch.

9. A local telecommunications network comprises:

at least one originating switch including memory means for recording LNP database-related query statistics;

at least one standard terminating switch including memory means for recording LNP database-related query statistics;

a local number portability-traffic analysis system (LNP-TAS) including an LNP database in communication with the originating switch and the standard terminating switch;

means for receiving LNP database query statistics from the switches in the LNP-TAS in order to determine an optimum LNP database query point during call delivery in the telecommunications network; and means for sending switch control updates from the LNP-TAS to the originating switch.

10. The network of claim 9 wherein the means for receiving LNP database query statistics from the switches comprises a data link between the LNP-TAS and each switch.

11. The network of claim 9 and further comprising means for controlling a trunk control system to establish trunks between switches.

12. The network of claim 9 and further comprising means for sending switch control updates from the LNP-TAS to the standard terminating switch.

13. An originating switch in a telecommunications network comprises:

means for recording LNP database-related query statistics;

a local number portability traffic analysis system for determining an optimum LNP database query point; and means responsive to the local number portability traffic analysis system for updating the originating switch in accordance with the optimum LNP database query point determination.

14. In a telecommunications network comprising at least one originating switch, at least one standard terminating switch and at least one serving switch, a method for accessing a local number portability database during call delivery comprises the steps of:

recording LNP database-related query statistics in an originating switch memory each time an LNP database query is performed by the switch;

receiving LNP database query statistics in a local number portability traffic analysis system at predetermined intervals;

using the LNP database-related query statistics received from the originating switch to determine an optimum LNP database query point in the call delivery process; and updating the originating switch with a switch control update message in accordance with the optimum LNP database query point determination.

* * * * *